(12) United States Patent
Hoyland et al.

(10) Patent No.: US 12,465,269 B2
(45) Date of Patent: Nov. 11, 2025

(54) VISUALIZATION OF VENTRICULAR TACHYCARDIA CAUSING REENTRANT CIRCUITS VIA PSEUDO-ACTIVATION MAPS

(71) Applicants: Johnson & Johnson Medical SAS, Issy-les-Moulineaux (FR); L'Université de Lorraine, Nancy (FR); The Centre Hospitalier Regional Universitaire de Nancy, Nancy (FR)

(72) Inventors: Philip Hoyland, Issy-les-Moulineaux (FR); Freddy Odille, Villers-les-Nancy (FR); Christian de Chillou de Churet, Marly (FR)

(73) Assignee: Biosense Webster (Israel) Ltd., Yokneam (IL)

( * ) Notice: Subject to any disclaimer, the term of this patent is extended or adjusted under 35 U.S.C. 154(b) by 524 days.

(21) Appl. No.: 17/724,146

(22) Filed: Apr. 19, 2022

(65) Prior Publication Data

US 2022/0338784 A1      Oct. 27, 2022

Related U.S. Application Data

(60) Provisional application No. 63/179,054, filed on Apr. 23, 2021.

(51) Int. Cl.
*A61B 5/367* (2021.01)
*A61B 5/00* (2006.01)
*G06T 17/20* (2006.01)

(52) U.S. Cl.
CPC ............ *A61B 5/367* (2021.01); *A61B 5/7246* (2013.01); *G06T 17/20* (2013.01); *G06T 2210/41* (2013.01)

(58) Field of Classification Search
CPC .............................. A61B 5/7246; A61B 5/367
See application file for complete search history.

(56) References Cited

U.S. PATENT DOCUMENTS 5,840,025 A *  11/1998  Ben-Haim ............. A61B 5/363
                                                    600/424
9,002,442 B2 *  4/2015  Harley ................... A61B 5/318
                                                    600/509

(Continued)

OTHER PUBLICATIONS

Odille et al., "Catheter Treatment of Ventricular Tachycardia: A Reference-Less Pace-Mapping Method to Identify Ablation Targets." IEEE transactions on bio-medical engineering vol. 66,11 (2019).

(Continued)

*Primary Examiner* — Eric D. Bertram
(74) *Attorney, Agent, or Firm* — Volpe Koenig

(57) ABSTRACT

Systems and methods are disclosed for visualizing reentrant circuits in the heart via pseudo-activation maps. Techniques disclosed comprise receiving sets of ECG data and respective pacing sites. Each of the sets is generated by pacing heart tissue at a respective site of the pacing sites. Techniques disclosed further comprise computing correlation gradients representative of morphological changes across sets, of the sets of the ECG data, of respective neighboring sites of the pacing sites. Based on the computed correlation gradients, a core zone associated with a reentrant circuit is identified. Then, relative to the identified core zone, one or more pseudo-activation maps are generated.

19 Claims, 9 Drawing Sheets

(56) References Cited

U.S. PATENT DOCUMENTS

| | | | |
|---|---|---|---|
| 10,891,728 B2 | 1/2021 | De Chillou | |
| 2019/0200886 A1* | 7/2019 | Welsh | A61B 5/291 |
| 2021/0228147 A1* | 7/2021 | Wang | A61B 5/296 |
| 2021/0327560 A1* | 10/2021 | Carmi | G06T 11/006 |
| 2021/0338137 A1* | 11/2021 | García Quintanilla | A61B 5/361 |

OTHER PUBLICATIONS

Hoyland et al., "A Paced-ECG Detector and Delineator for Automatic Multi-Parametric Catheter Mapping of Ventricular Tachycardia," in IEEE Access, vol. 8, pp. 223952-223960 (2020).
Extended European Search Report dated Sep. 9, 2022 for European Patent Application No. 22169727.9.

\* cited by examiner

100

200

400

500

600

A.
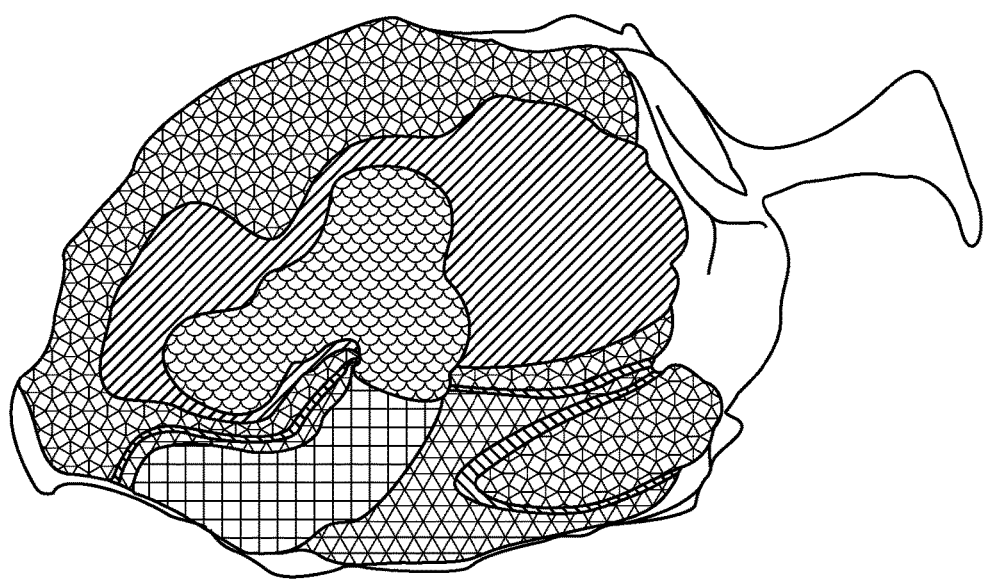
B.
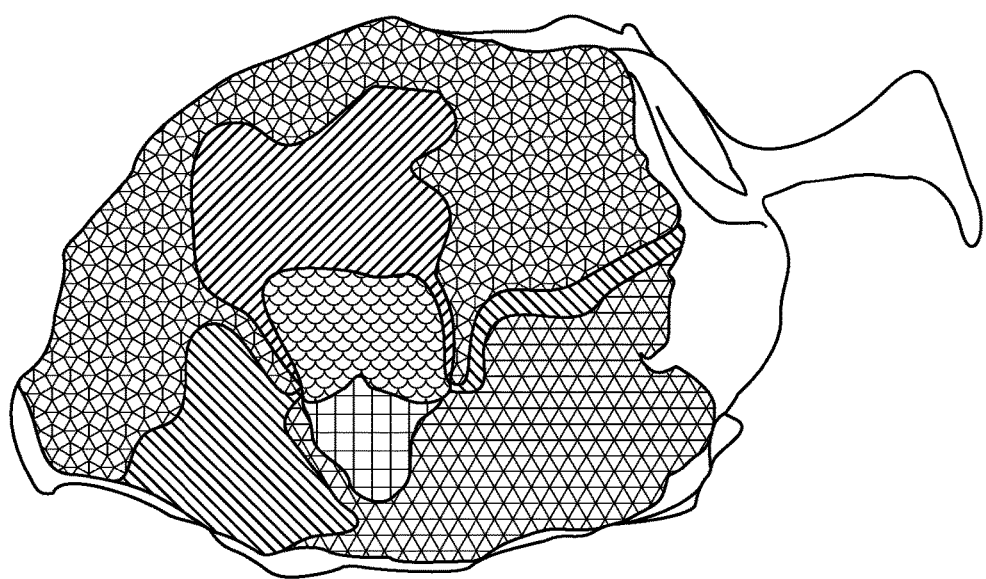
FIG. 7
700

800

A.
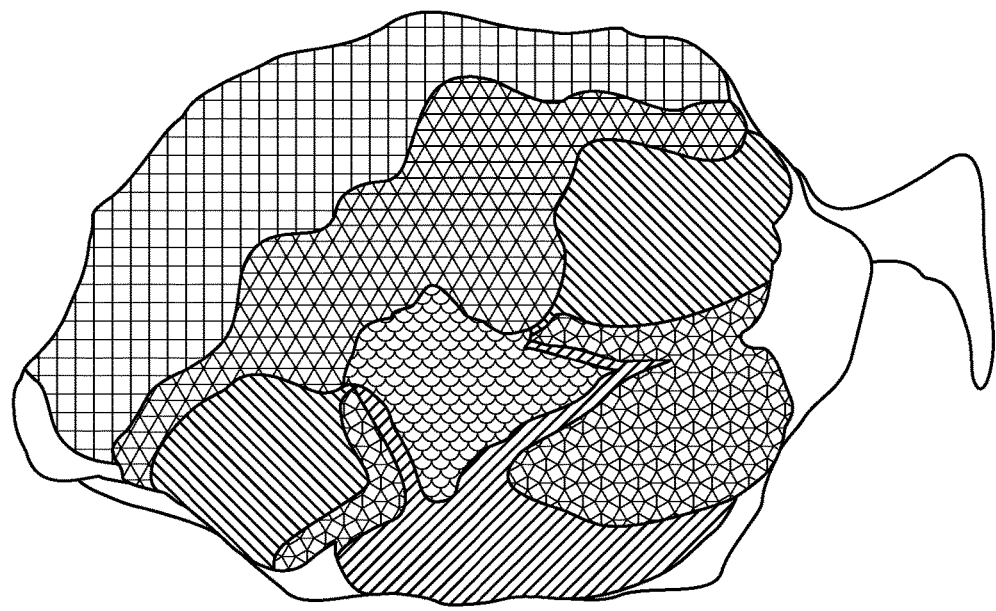
B.
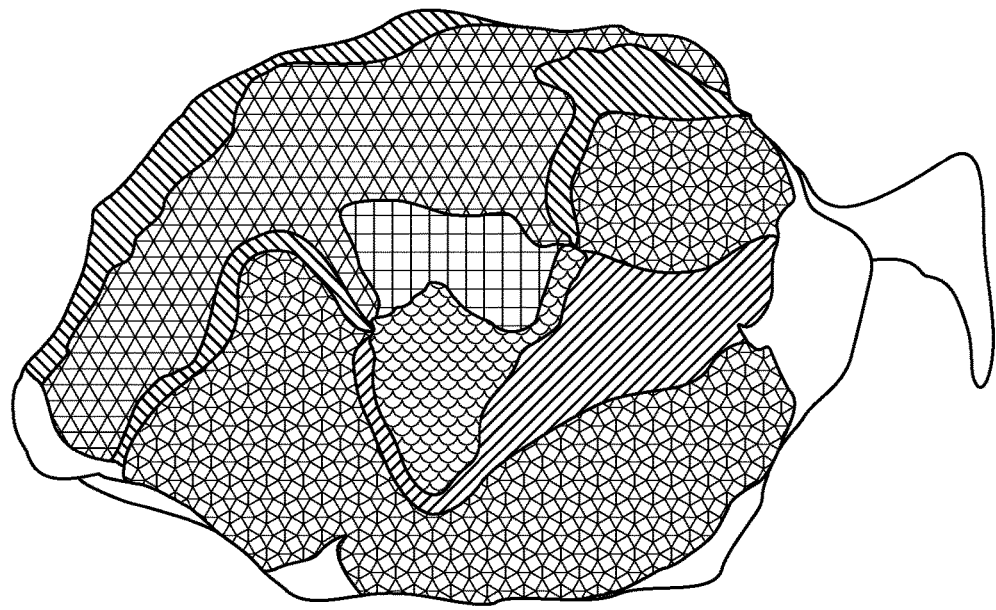
FIG. 9
900

VISUALIZATION OF VENTRICULAR TACHYCARDIA CAUSING REENTRANT CIRCUITS VIA PSEUDO-ACTIVATION MAPS

CROSS REFERENCE TO A RELATED APPLICATION

This application claims the benefit of U.S. Provisional Patent App. No. 63/179,054, filed Apr. 23, 2021, the disclosure of which is hereby incorporated by reference herein by its entirety.

BACKGROUND

In a normal heartbeat rhythm, electrical pulses originate in the atria and propagate to the ventricles, causing the ventricles to contract in a synchronized manner. Such contractions push blood, received from the atria, from the ventricles to the lungs and to other organs in the body. Ventricular tachycardia (VT), a type of arrhythmia, can occur by electrical pulses that originate at the ventricles themselves. A VT condition interferes with the normal contraction rhythm of the ventricles, as it causes accelerated heartbeats (e.g., above 180 beats per minute) that result in contractions of empty (or not yet blood-filled) ventricles. If not treated, a VT condition can be life-threatening, as such a condition can degenerate into a ventricular fibrillation (VF) that can lead to a cardiac arrest.

VT is often caused by the presence of one or more reentrant circuits at the ventricular tissue. Reentrant circuits are the source of electrical pulses in the ventricles. To treat VT, an ablation procedure is employed, wherein radiofrequency energy is applied to tissues at the reentrant circuits to block the flow of the electrical signals across them. In order for the ablation to be effective, the structure and orientation of reentrant circuits should be visualized.

BRIEF DESCRIPTION OF THE DRAWINGS

A more detailed understanding can be had from the following description, given by way of example in conjunction with the accompanying drawings wherein:

FIG. 7 shows an example visual representation of a pseudo-activation map and an activation map, in accordance with one or more embodiments of the disclosure;

FIG. 9 shows an example visual representation of a pseudo-activation map and an opposite activation map, in accordance with one or more embodiments of the disclosure.

DETAILED DESCRIPTION

Figure 1:
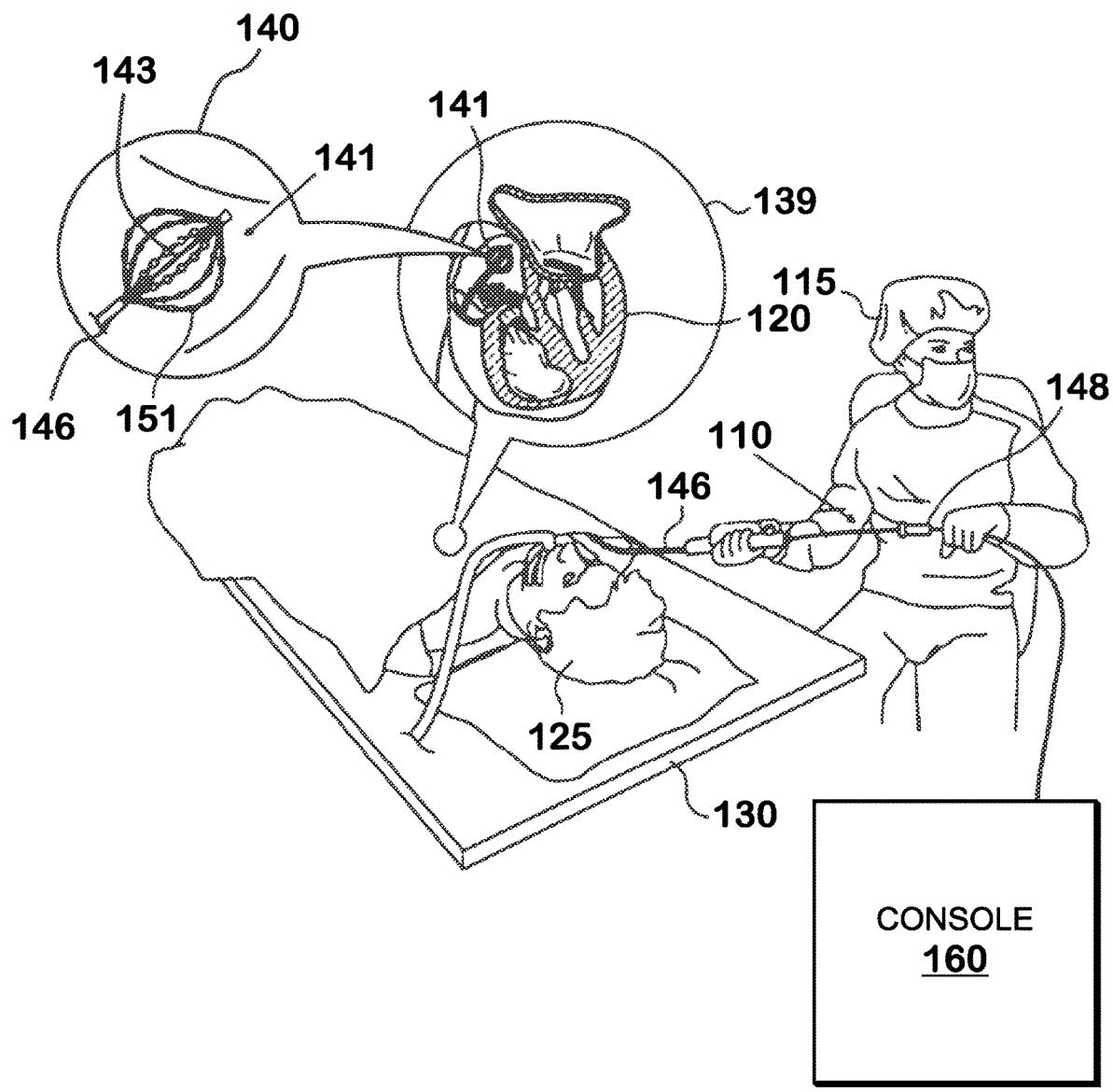
FIG. 1 is a diagram of an example apparatus for cardiac pacing and diagnosis, based on which one or more features of the disclosure can be implemented.

A myocardial infarction can lead to a life-threatening VT. The infarcted region of the heart may undergo a process during which damaged myocardial tissue may be replaced by fibrosis, and, then, may evolve into a scar. Such a process can impact the flow of electric currents, so that a region that is scarred blocks electrical conduction and a region that contains surviving myocardial fibers decreases electrical conduction. This heterogeneous conductivity creates a so-called reentrant circuit that has been shown to be a common cause of VT. In a reentrant circuit an electric current comes out of region of low conduction with a delay greater than the myocyte refractory period, causing a repeating excitation of the healthy myocytes.

A VT treatment procedure, typically, begins with a diagnosis phase, where the origin of a reentrant circuit is identified, followed by an ablation phase, where radiofrequency heating is applied to the core of the reentrant circuit in order to disrupt the excitation caused by it. During the diagnosis phase, accurately visualizing the reentrant circuit is crucial in effectively ablating the reentrant circuit. The most direct technique to visualize a reentrant circuit is by an activation map. Activation mapping involves acquiring intra-cardiac electrical signals, termed electrograms, by placing the catheter at different sites on the ventricular tissue during a sustained VT. A three-dimensional (3D) map of propagation delays between electrograms can then be reconstructed, which represents the activation pathways of the VT. Unfortunately, activation mapping can only be performed in a small number of patients who can tolerate a sustained VT for the whole duration of the mapping.

Pace-mapping is another technique that was shown to be a good alternative to direct activation mapping. Pace-mapping involves stimulating the heart with a catheter at different sites on the ventricular tissue to produce activation pathways that originate from these sites. The exit site of a reentrant circuit is identified when the activation pathway best matches an activation pathway previously recorded during an induced VT for that patient—that is, at a pacing site where the electrocardiogram (ECG) data recorded during pacing best matches the ECG data recorded during the induced VT. Hence, a similarity metric can be used to correlate (compare) morphologies of QRS complexes from ECG data recorded during pacing and ECG data recorded during the induced VT. This conventional pace-mapping technique is advantageous as: 1) only a short ECG data recording of the VT is necessary; 2) the actual reentrant circuit can be reconstructed and visualized; and 3) after radiofrequency ablation, a feedback on the efficiency of the applied ablation can be obtained by stimulating the tissue at the entrance of the circuit to demonstrate that no electric current can enter this circuit any more. However, this technique is limited because it requires a reference recording during an induced VT, yet in some patients a VT cannot be induced.

Reference-less pace-mapping is another technique for visualizing reentrant circuits, and, thereby, identifying a target (core) zone for ablation. Reference-less pace-mapping relies solely on ECG data recorded during the pace-mapping procedure, not requiring a reference recording during an induced VT. Since the core of a reentrant circuit was shown to exhibit abrupt changes in the activation pathways, in this technique, regions corresponding to abrupt changes in activation pathways are highlighted. This is done by comparing ECG data generated at neighboring pacing sites, rather than comparing between ECG data generated at a pacing site and ECG data generated during an induced VT. As shown herein, a reference-less pace-mapping accurately identifies the same core zones as a conventional pace mapping.

In a reference-less pace-mapping, correlation gradients are computed based on morphological changes in ECG data of a network of pacing sites. The correlation gradients can indicate zones of abrupt spatial variations in the ECG data generated by pacing as the pacing catheter is moved across neighboring sites along the ventricular tissue. Correlation gradients can be computed based on a similarity metric that measures the morphological similarity between two QRS complexes from ECG data recorded during pacing at respective neighboring pacing sites. Morphological changes in paced ECG data can serve as indicators of changes in activation pathways. Detecting the former can locate a core zone that contains a reentrant circuit, because core zones containing reentrant circuits exhibit abrupt changes in activation pathways.

However, although correlation gradients can highlight a core zone, they do not provide a complete visualization of the reentrant circuit—current systems do not use information found in the data collected by pace-mapping to determine the structure and orientation of reentrant circuits. Moreover, the entrance of reentrant circuits has been shown to be associated with long (or longer) intervals between pacing and the resulting QRS complex. These intervals are referred to as stimulus-to-QRS (sQRS) delays. sQRS delays collected during pace-mapping are currently underused in the characterization of reentrant circuits. For example, a paced point located deep in a scar area will have a longer sQRS delay than a paced point in a healthy area. As disclosed herein, a pseudo-activation map is generated based on data collected during a pace-mapping procedure, such as correlation maps, correlation gradient maps, or sQRS delays, and possibly based on complementary data collected during sinus rhythm, such as conduction velocities. The pseudo-activation map can be used to effectively target tissue for ablation in VT treatment.

Aspects of the present disclosure describe methods for visualizing reentrant circuits in the heart via pseudo-activation maps, employed by a processor. The methods comprise receiving sets of ECG data and respective pacing sites, each of the sets is generated by pacing a heart tissue at a respective site of the pacing sites. The methods further comprise computing correlation gradients representative of morphological changes across sets, of the sets of the ECG data, of respective neighboring sites of the pacing sites. Then, identifying, based on the correlation gradients, a core zone associated with a reentrant circuit and generating a pseudo-activation map relative to the identified core zone.

Aspects of the present disclosure also describe systems for visualizing reentrant circuits in the heart via pseudo activation maps. The systems comprise at least one processor and memory storing instructions. The instructions, when executed by the at least one processor, cause the system to receive sets of ECG data and respective pacing sites, each of the sets is generated by pacing a heart tissue at a respective site of the pacing sites. The instructions further cause the system to compute correlation gradients representative of morphological changes across sets, of the sets of the ECG data, of respective neighboring sites of the pacing sites; to identify, based on the correlation gradients, a core zone associated with a reentrant circuit; and to generate a pseudo-activation map relative to the identified core zone.

Furthermore, aspects of the present disclosure describe a non-transitory computer-readable medium comprising instructions executable by at least one processor to perform methods for visualizing reentrant circuits in the heart via pseudo-activation maps. The methods comprise receiving sets of ECG data and respective pacing sites, each of the sets is generated by pacing a heart tissue at a respective site of the pacing sites. The methods further comprise computing correlation gradients representative of morphological changes across sets, of the sets of the ECG data, of respective neighboring sites of the pacing sites. Then, identifying, based on the correlation gradients, a core zone associated with a reentrant circuit and generating a pseudo-activation map relative to the identified core zone.

FIG. 1 is a diagram of an example apparatus 100 for cardiac pacing and diagnosis, based on which one or more features of the disclosure can be implemented. The apparatus 100 can be generally referred to as medical device equipment. All or parts of the apparatus 100 may be used to collect biometric data via universal pacing operations and/or to implement cardiac pacing and diagnosis software described herein. The apparatus 100 can be configured to perform operations for generating a pseudo-activation map using information found in the data collected from pace-mapping. The apparatus 100 can be configured to collect pace-mapping data and generate the pseudo-activation map, or to generate the pseudo-activation map based on pace-mapping data processed by the apparatus 100.

The cardiac pacing and diagnosis apparatus 100 includes a probe 110 that may be navigated by a physician or a medical professional 115 into a body part, such as a heart 120 (see inset 139) of a patient 125 lying on a bed (or a table) 130. The probe 110 can represent multiple probes, according to embodiments. However, for purposes of conciseness, a single probe 110 is described herein. An inset 140 shows an enlarged view of the distal end of the probe 110 inside a cardiac chamber of the heart 120. As shown in inset 140, the probe 110 includes a catheter 141, a shaft 143, and a sheath 146. The catheter 141 includes one or more elements. A catheter's element may be an electrode 151.

The probe 110 is connected to (and/or in communication with) a console 160 that is configured to store the data acquired by the probe 100 and to execute the cardiac pacing and diagnosis software therein. According to embodiments, the medical professional 115 may insert the shaft 143 through the sheath 146, while manipulating the distal end of the shaft 143 using a manipulator 148 connected to the proximal end of the probe 110. For example, using the manipulator 148, the medical professional 115 can deflect the distal end of the shaft 143 from the sheath 146. The catheter 141 (that as shown in inset 140 is fitted at the distal end of the shaft 143) may be inserted through the sheath 146 in a collapsed state and may be then expanded within the heart 120.

In accordance with one or more embodiments, the catheter 141 may be of any shape or type and may be representative of one or more catheters. The catheter 141 can include one or more elements that are used to implement the embodiments disclosed herein. The one or more elements may be any elements that can be configured to pace, to ablate, and/or to measure biometric data. For example, in an embodiment, the one or more elements may be electrodes (e.g., electrode 151), transducers, other elements, or a combination thereof. The catheter 141 may include multiple elements that may be connected via splines that form the shape of the catheter 141. For example, the catheter 141 may be a Picasso catheter having a plurality of electrodes. A Picasso catheter, for example, can have 48 electrodes or more. Other examples of the catheter 141 include a linear catheter with linearly arranged electrodes, a balloon catheter including electrodes dispersed on multiple splines that shape the balloon, a lasso or loop catheter with circularly arranged electrodes, or any other applicable shape. A catheter 14 may be fully or partially elastic such that it can twist, bend, or otherwise change its shape based on received signals and/or based on the application of an external force (e.g., exerted by cardiac tissue) on the catheter.

The catheter 141 may be configured to damage tissue areas of an intra-body organ, such as by ablating tissue areas of a cardiac chamber of the heart 120. The catheter 141 may further be configured to pace with pulses; then, biometric data may be obtained in response to those pulses. In this regard, the catheter 141 may be positioned in the patient's 125 body (e.g., within the heart 120). The position of the catheter 141 may be determined by the console 160, for example, based on transducers located in proximity to the body of the patient 125 and position electrodes attached to the catheter 141. The catheter 141 may also be configured to measure biometric data (e.g., electrical signals of the heart, such as a sinus rhythm) obtained from within the body (e.g., the heart 120) of the patient 125. The obtained biometric data may be associated with the determined position of the catheter, such that a rendering of the patient's body part (e.g., the heart 120) may be displayed, showing the biometric data overlaid on a shape of the body. Note that the sinus rhythm can be any cardiac rhythm in which depolarization of a cardiac muscle begins at a sinus node. For example, the sinus rhythm can include a normal heart beat with respect to the heart rate and rhythm (e.g., a human heart rate is generally between 60 and 100 beats per minute).

The cardiac pacing and diagnosis apparatus 100 can be utilized to detect, diagnose, and treat cardiac conditions. Cardiac conditions, such as cardiac arrhythmias are common and dangerous medical ailments, especially in the aging population. In patients with normal sinus rhythm, the heart (which is comprised of atrial, ventricular, and excitatory conduction tissue) is electrically excited to beat in a synchronous, patterned fashion. In patients with cardiac arrhythmias, abnormal regions of cardiac tissue do not follow the synchronous beating cycle associated with normally conductive tissue as observed among patients with normal sinus rhythm. Instead, the abnormal regions of cardiac tissue aberrantly conduct to adjacent tissue, thereby disrupting the cardiac cycle into an asynchronous cardiac rhythm. Such abnormal conduction has been previously known to occur in various regions of the heart, for example, in the region of the sino-atrial (SA) node, along the conduction pathways of the atrioventricular (AV) node, or in the cardiac muscle tissue forming the walls of the ventricular and atrial cardiac chambers.

VT is a type of arrhythmia that is characterized by a fast heart rhythm that originates in one of the ventricles of the heart. This is a potentially life-threatening arrhythmia because it may lead to ventricular fibrillation and sudden death. VT is a cardiac arrhythmia that may be of a multi-wavelet reentrant type, characterized by multiple asynchronous loops of electrical impulses that are scattered about a heart chamber and are often self-propagating. Alternatively, or in addition to the multiwavelet reentrant type, a cardiac arrhythmia may also have a focal origin, such as when an isolated region of tissue fires autonomously in a rapid, repetitive fashion (which can be a focal point of interest for the cardiac pacing and diagnosis apparatus 100).

As described herein, the cardiac pacing and diagnosis apparatus 100 provides cardiac physicians and medical personnel a way to observe how a specific focal point of the heart tissue responds to pacing. Thus, the cardiac pacing and diagnosis apparatus 100 particularly utilizes the catheter 141 and the console 160 to enable pacing procedures and to implement signal analysis that are not, otherwise, currently available or currently performed by cardiac physicians and medical personnel. More particularly, the console 160, that is connected to and in communication with the probe 110 and the catheter 141, may store and execute the cardiac pacing and diagnosis software. According to an embodiment, the console 160 includes at least one processor and memory, where the processor executes computer instructions (with respect to the cardiac pacing and diagnosis software described herein) and the memory stores the computer instructions for execution by the processor.

The console 160 can be any computing device comprising software and/or hardware, such as a general-purpose computer, with suitable front-end and interface circuits for transmitting and receiving signals to and from the catheter 141, as well as for controlling the other components of the apparatus 100. The front-end and interface circuits include input/output (I/O) communication interfaces that enables the console 160 to receive signals from and/or transfer signals to a catheter's electrode 151. In some embodiments, the console 160 may be further configured to receive biometric data, such as electrical activity, based on which it can determine whether a given tissue area conducts electricity. According to an embodiment, parts of or all the console 160 may be located, for example, in the catheter 151, in an external device, in a mobile device, in a cloud-based device, or may be a standalone processor/computer.

As noted above, the console 160 may include a general-purpose computer, which may be programmed in software (e.g., the cardiac pacing and diagnosis software) to carry out the functions of the cardiac pacing and diagnosis apparatus 100 described herein. The software may be downloaded to the general-purpose computer in electronic form, over a network, for example, or it may, alternatively or additionally, be provided and/or stored on non-transitory tangible media, such as magnetic, optical, or electronic memory (e.g., any suitable volatile and/or non-volatile memory, such as random-access memory or a hard disk drive).

According to an embodiment, a display may be connected to the console 160. During a procedure, the console 160 may facilitate the presentation of a body part to the medical professional 115, rendered on the display, and store the data representing the body part in memory. In some embodiments, the medical professional 115 may be able to manipulate the rendered presentation of the body part using one or more input devices such as a touch pad, a mouse, a keyboard, a gesture recognition apparatus, or the like. For example, an input device may be used to change a position of the catheter 141, such that the rendering is updated. In alternative embodiments, the display may include a touch screen that can be configured to accept inputs from the medical professional 115, in addition to presenting the rendered body part. Note that the display may be local or remote to the console 160, located at a same location or in a remote location such as a separate hospital or in separate healthcare provider networks.

The console 160 may be connected, by a cable, to body surface electrodes that may include adhesive skin patches that are affixed to the patient 125. The processor of the console 160, in conjunction with a current tracking module, may determine the position coordinates of the catheter 141 inside the body part (e.g., the heart 120) of the patient 125. The position coordinates may be based on impedances or electromagnetic fields measured between the body surface electrodes and the electrode 151 or other electromagnetic components of the catheter 141. Additionally, or alternatively, location pads may be located on a surface of the bed 130 and may be separate from the bed 130.

The cardiac pacing and diagnosis apparatus 100 may obtain anatomical measurements of the heart 120 using ultrasound, computed tomography (CT), magnetic resonance imaging (MRI) or using other medical imaging modalities known in the art. The cardiac pacing and diagnosis apparatus 100 may obtain electrical measurements such as ECGs using catheters 141 or other sensors that measure electrical properties of the heart 120. Hence, biometric data, that may include electrical as well as anatomical measurements, may then be stored in a non-transitory tangible media of the console 160. The biometric data may be transmitted from the non-transitory tangible media to a server, which may be local or remote, using a network as further described herein.

According to one or more embodiments, catheters 141 containing position sensors may be used to determine the trajectory of points on the cardiac surface. These trajectories may be used to infer motion characteristics such as the contractility of the tissue. Maps depicting such motion characteristics may be constructed, preferably, when the trajectory information is sampled at a sufficient number of location points in the heart.

The cardiac pacing and diagnosis apparatus 100 shown in FIG. 1 may be modified to implement the embodiments disclosed herein. The disclosed embodiments may similarly be applied using other system components and settings. The apparatus 100 shown in FIG. 1 may include additional components, such as other elements for sensing electrical activity, wired or wireless connectors, processing, storing, and display devices, and the like. The cardiac pacing and diagnosis apparatus 100 may be part of a surgical system that is configured to obtain anatomical and electrical measurements of the heart 120 and to perform cardiac ablation procedures. An example of such a surgical system is the Carto® system sold by Biosense Webster.

Figure 2:
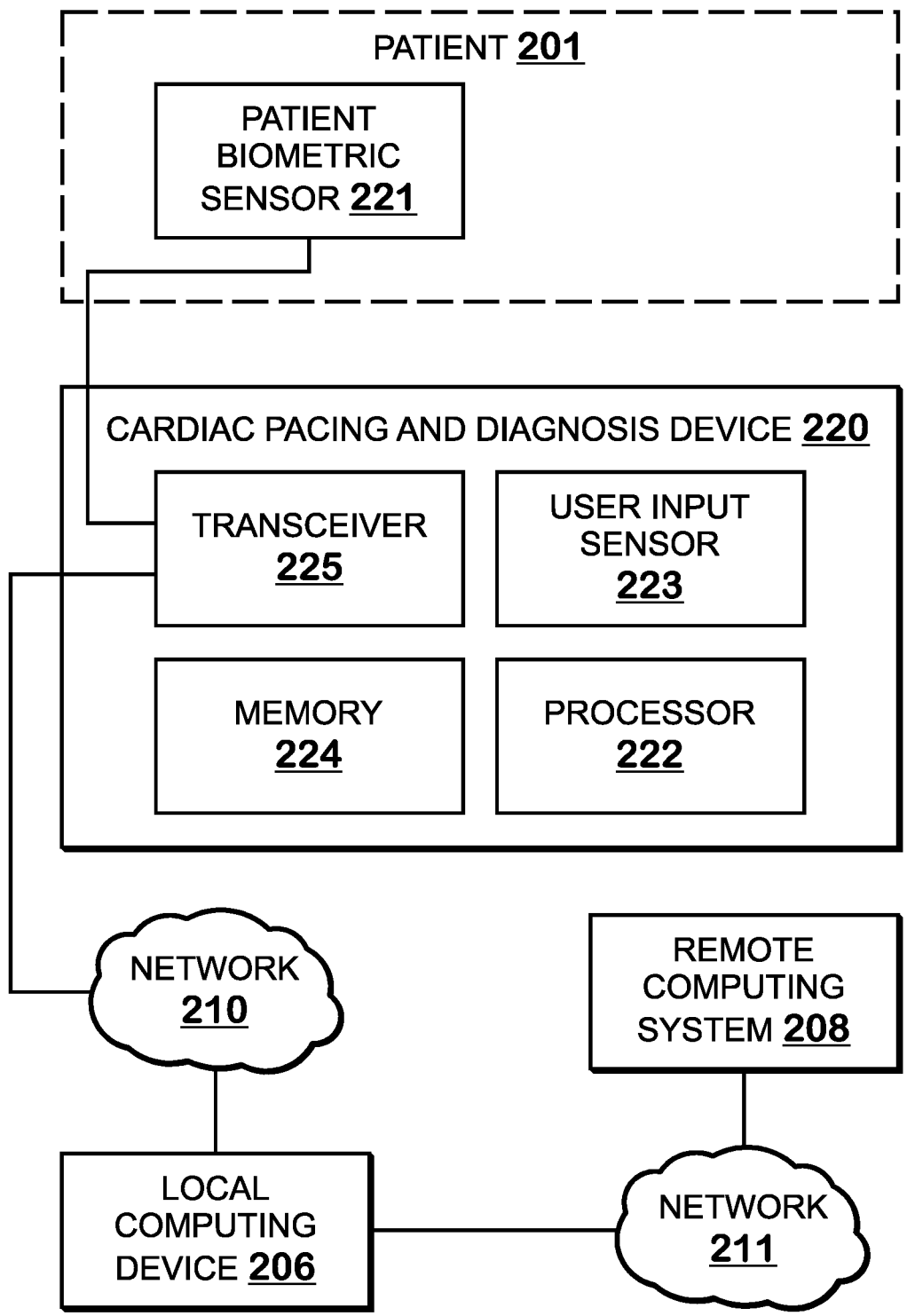
FIG. 2 is a functional block diagram of an example system for cardiac pacing and diagnosis, based on which one or more features of the disclosure can be implemented.

FIG. 2 is a functional block diagram of an example system 200 for cardiac pacing and diagnosis, based on which one or more features of the disclosure can be implemented. The system 200 includes a patient 201 (e.g., the patient 125 of FIG. 1), a local computing device 206, a remote computing system 208, a first network 210, and a second network 211. Further, the system 200 includes a patient biometric sensor 221 (e.g., the catheter 141 of FIG. 1) communicatively connected to a cardiac pacing and diagnosis device 220 (e.g., the console 160 of FIG. 1). The cardiac pacing and diagnosis device 220 may include a processor 222, a user input sensor 223, memory 224, and a transmitter-receiver (i.e., transceiver) 225.

The local computing device 206 and/or the remote computing system 208, along with the cardiac pacing and diagnosis device 220, can be any combination of software, firmware, and/or hardware that individually or collectively store, execute, and implement the cardiac pacing and diagnosis software and functions thereof. Further, the local computing device 206 and/or the remote computing system 208, along with the cardiac pacing and diagnosis device 220, can be an electronic, computer framework comprising and/or employing any number and combination of computing device and networks utilizing various communication technologies, as described herein. The local computing device 206 and/or the remote computing system 208, along with the cardiac pacing and diagnosis device 220, can be scalable, extensible, and modular, with the ability to change to different services or reconfigure some features independently of others. According to an embodiment, the local computing device 206 and the remote computing system 208, along with the cardiac pacing and diagnosis device 220, may include at least a processor (e.g., the processor 222 of FIG. 2) and memory (e.g., the memory 224 of FIG. 2), where the processor executes computer instructions (with respect to the cardiac pacing and diagnosis software) and the memory stores the computer instructions for execution by the processor.

The local computing device 206 of the cardiac pacing and diagnosis system 200 is in communication with the cardiac pacing and diagnosis device 220 and may be configured to act as a gateway to the remote computing system 208 through the second network 211. The local computing device 206 may also be configured to display acquired biometric data of the patient. The local computing device 206 may be, for example, a smartphone, smartwatch, tablet or other portable smart device configured to communicate with other devices, for example, via network 211. Alternatively, the local computing device 206 may be a stationary or standalone device, such as a stationary base station, desktop, or laptop computer using an executable program to communicate information between the cardiac pacing and diagnosis device 220 and the remote computing system 208 via, for example, a modem, router, radio module, and/or a USB dongle. Biometric data may be communicated between the local computing device 206 and the cardiac pacing and diagnosis device 220 using a short-range wireless technology standard via a short-range wireless network 210, such as a local area network (LAN) (e.g., a personal area network (PAN)). Thus, information may be sent, via network 210, between the cardiac pacing and diagnosis device 220 and the local computing device 206 using any one of various short-range wireless communication protocols, such as Bluetooth, Wi-Fi, Zigbee, Z-Wave, near field communications (NFC), ultra-band, or infrared (IR).

The remote computing system 208 may be configured to provide (visually and/or aurally) biometric data of the patient 125, presenting the data to a medical professional, a physician, or a healthcare professional. Hence, the remote computing system 208 may be configured to receive the biometric data of the monitored patient 125 via network 211, which may be a long-range network. For example, if the local computing device 206 is a mobile phone, network 211 may be a wireless cellular network, and information may be communicated between the local computing device 206 and the remote computing system 208 via a wireless technology standard, such as any of the wireless technologies mentioned above. The network 211 may be a wired network, a wireless network or a combination thereof, such as an intranet, a local area network (LAN), a wide area network (WAN), a metropolitan area network (MAN), a direct connection or series of connections, a cellular telephone network, or any other network or medium capable of facilitating communication between the local computing device 206 and the remote computing system 208. Information may be sent, via the network 211 using any one of various long-range wireless communication protocols (e.g., TCP/IP, HTTP, 3G, 4G/LTE, or 5G/New Radio). Wired connections may be implemented using Ethernet, Universal Serial Bus (USB), RJ-11 or any other wired connection generally known in the art. Wireless connections may be implemented using Wi-Fi, WiMAX, Bluetooth, infrared, cellular networks, satellite or any other wireless connection methodology. Additionally, several networks may work alone or in communication with each other to facilitate communication in the network 211. In some instances, the remote computing system 208 may be implemented as a physical server on the network 211. In other instances, the remote computing system 208 may be implemented as a virtual server a public cloud computing provider (e.g., Amazon Web Services (AWS)®) of the network 211.

In operation, the cardiac pacing and diagnosis device 220, utilizing the cardiac pacing and diagnosis software, may obtain biometric data of the patient 201 (e.g., electrical signals, blood pressure, temperature, blood glucose level, or other biometric data) acquired by the patient biometric sensor 221. In an aspect, at least a portion of the obtained biometric data may be received from one or more other patient biometric diagnosis devices. The cardiac pacing and diagnosis software is processor-executable code that is necessarily rooted in process operations by, and in processing hardware of, the cardiac pacing and diagnosis device 220 to provide a method for analyzing a specific region or focal point of heart tissue in response to a pacing procedure. According to an embodiment, the cardiac pacing and diagnosis software of the cardiac pacing and diagnosis device 220 provides specific pacing and capturing operations that involve a multi-step manipulation of electrical signals with respect to the heart tissue and that facilitates understanding of the electrophysiology of the heart tissue with more precision. The cardiac pacing and diagnosis device 220 may employ the cardiac pacing and diagnosis software to process data, including the obtained biometric data as well as any biometric data received from the one or more other patient biometric diagnosis devices. For example, when processing data in this regard, the cardiac pacing and diagnosis software may include a neural network that is used to learn latent representations (or data codings) in an unsupervised manner from the biometric data. Further, the cardiac pacing and diagnosis software may learn to detect specific data by training the neural network.

The cardiac pacing and diagnosis device 220 may continually or periodically monitor, store, process, and communicate, via network 210, any number of various patient biometrics (e.g., the acquired biometric data). As described herein, examples of patient biometrics include electrical signals (e.g., ECG signals and brain biometrics), blood pressure data, blood glucose data, and temperature data. The patient biometrics may be monitored and communicated for treatment across any number of various diseases, such as cardiovascular diseases (e.g., arrhythmias, cardiomyopathy, and coronary artery disease) and autoimmune diseases (e.g., type I and type II diabetes).

The patient biometric sensor 221 may include, for example, one or more transducers configured to convert one or more environmental conditions into an electrical signal, such that different types of biometric data can be observed, obtained, or acquired. For example, the patient biometric sensor 221 may include one or more electrodes (e.g., the electrode 151 of FIG. 1), one or more transducers, a temperature sensor (e.g., thermocouple), a blood pressure sensor, a blood glucose sensor, a blood oxygen sensor, a pH sensor, an accelerometer, and a microphone.

The processor 222, in executing the cardiac pacing and diagnosis software, may be configured to receive, process, and manage, biometric data acquired by the patient biometric sensor 221, to store the biometric data in memory 224, and/or to transmit the biometric data across the network 210 via the transceiver 225. Data from one or more other cardiac pacing and diagnosis device 220 may also be received by the processor 222 through the transceiver 225, as described in more detail herein. Also, as described herein, the processor 222 may be configured to respond selectively to different tapping patterns (e.g., a single tap or a double tap) received from the user input sensor 223 (e.g., a capacitive sensor therein), such that different tasks (e.g., acquisition, storing, or transmission of data) may be activated based on the detected pattern. In some embodiments, the processor 222 can generate audible feedback in response to a detection of a gesture.

The user input sensor 223 includes, for example, a piezoelectric sensor or a capacitive sensor configured to receive user input, such as tapping or touching. For example, the user input sensor 223 may be controlled to implement a capacitive coupling, in response to tapping or touching a surface of the cardiac pacing and diagnosis device 220 by the patient 201. Gesture recognition may be implemented via any one of various capacitive types, such as resistive capacitive, surface capacitive, projected capacitive, surface acoustic wave, piezoelectric and infra-red touching. Capacitive sensors may be disposed at a small area or over a length of the surface, such that the tapping or touching of the surface activates the monitoring device.

The memory 224 may be any non-transitory tangible media, such as magnetic, optical, or electronic memory units. The memory 224 may be any suitable volatile and/or non-volatile memory, such as random-access memory or a hard disk drive. The memory 224 stores the cardiac pacing and diagnosis software for execution by the processor 222.

The transceiver 225 may represent one or more transceivers, each may include a separate transmitter and a separate receiver. Alternatively, the transceiver 225 may include a transmitter and a receiver integrated into a single device.

According to an embodiment, the cardiac pacing and diagnosis device 220 may be an apparatus that is internal to the body of the patient 201 (e.g., subcutaneously implantable). In such a case, the cardiac pacing and diagnosis device 220 may be inserted into the patient 201 via any applicable manner, including orally injecting, surgical inserting via a vein or an artery, or via an endoscopic procedure or a laparoscopic procedure. According to an embodiment, the cardiac pacing and diagnosis device 220 may be an apparatus that is external to the patient 201. For example, as described in more detail herein, the cardiac pacing and diagnosis device 220 may include an attachable patch (e.g., that attaches to the patient's skin). According to an embodiment, the cardiac pacing and diagnosis device 220 may include both components that are internal to the patient and components that are external to the patient. While a single cardiac pacing and diagnosis device 220 is shown in the system 200 of FIG. 2, in an aspect, system 200 may include a plurality of patient biometric diagnosis devices. In such a case, the cardiac pacing and diagnosis device 220 may be in communication with one or more other patient biometric diagnosis devices. Furthermore, the one or more other patient biometric diagnosis devices may be in communication with the network 210 and other components of the cardiac pacing and diagnosis system 200.

As recited above, disclosed herein is a method for generating a pseudo-activation map using data collected from a pace-mapping procedure. In an aspect, the data collected include surface ECG data (referred to herein also as ECG data) recorded during the pace-mapping procedure. The ECG data contain sets that each may contain multiple leads (signals measured at respective pairs of electrodes), each set generated by stimulating the heart tissue at a respective pacing site. A standard ECG records the cardiac activity using 12 leads, including three standard leads (I, II, III), three unipolar limb leads (aVR, aVL, aVF), and six precordial leads from V1 to V6. A set of 12-lead ECG is a set of 12 signals, each having a particular shape such as a bump for a P wave or a rapid variation for a QRS complex (lasting approximately 0.08 seconds). A QRS complex corresponds to the depolarization of the ventricles ensued by a tissue stimulation at a pacing site. The present disclosure describes collecting ECG data collected from a pace-mapping procedure, but it should be understood that the teachings described herein can also be applied when other VT associated data are collected using other techniques.

Figure 3:
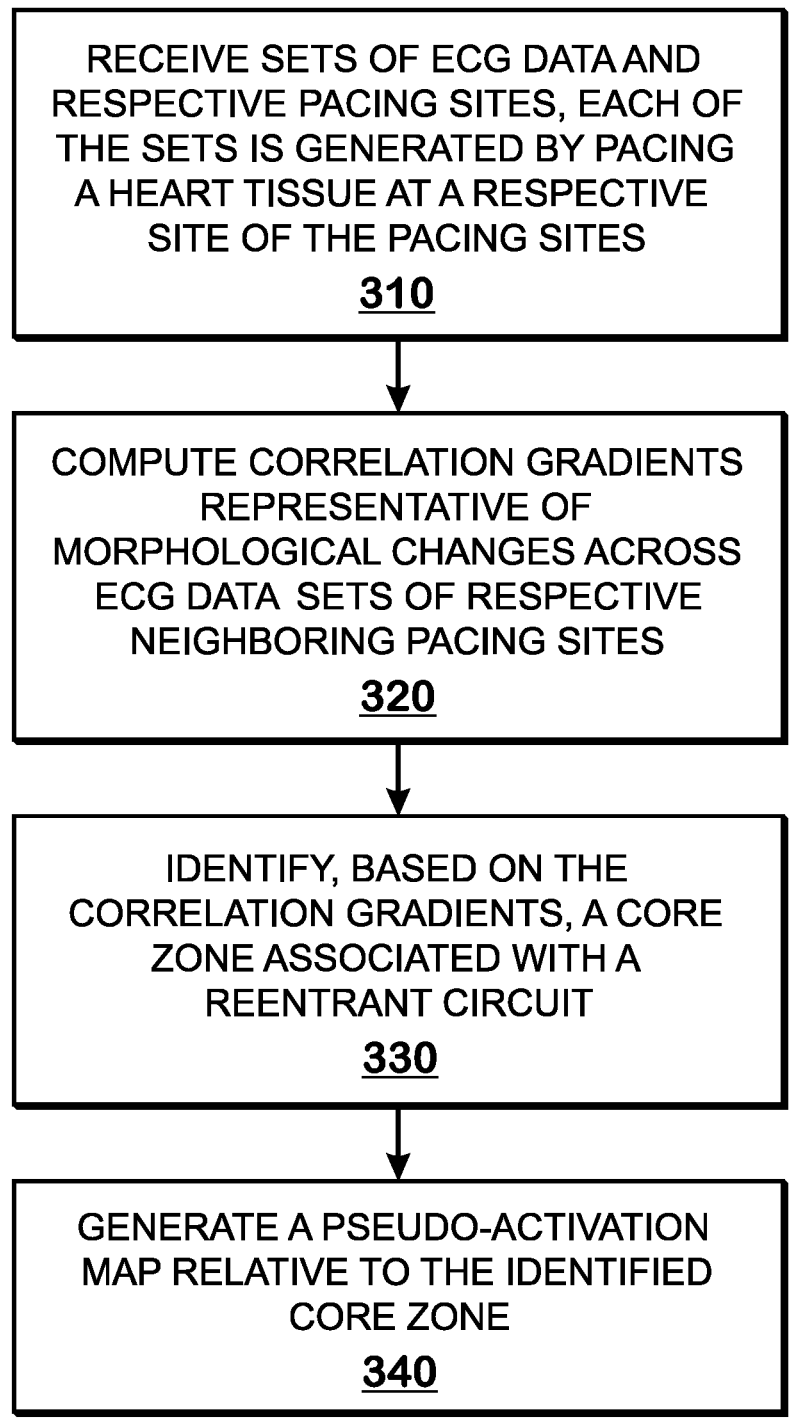
FIG. 3 is a flowchart of an example method for visualizing reentrant circuits in the heart via pseudo-activation maps, based on which one or more features of the disclosure can be implemented.

FIG. 3 is a flowchart of an example method 300 for visualizing reentrant circuits in the heart via pseudo-activation maps, based on which one or more features of the disclosure can be implemented. The method 300 may be employed by a processor (e.g., the processor 222 of the cardiac pacing and diagnosis device 220 of system 200 shown in FIG. 2). The method 300 begins, in step 310, by receiving sets of ECG data and respective pacing sites. Each of the received sets of ECG data may be generated by pacing a heart tissue (e.g., using the catheter 141 of the apparatus 100 shown in FIG. 1) at a respective pacing site of the received pacing sites. A set of ECG data may include 12-lead ECG signals generated by stimulating the heart tissue at a respective pacing site. Typically, the locations of the pacing sites are obtained by tracking the 3D location of the catheter performing the pacing at these pacing sites. In step 320, correlation gradients representative of morphological changes across sets of ECG data of respective neighboring pacing sites may be computed. Based on the correlation gradients, a core zone associated with a reentrant circuit at the heart may be identified in step 330. Then, in step 340, a pseudo-activation map is generated relative to the identified core zone.

The method 300 further comprises generating a 3D surface mesh based on the received pacing sites, where the pacing sites form the nodes of a graph and where pairs of the pacing sites are linked by the edges of the graph. Thus, a correlation gradient may be computed with respect to an edge of the 3D surface mesh based on morphological changes between two sets of ECG data of respective pacing sites linked by the edge. In an aspect, the 3D surface mesh comprises edges with respective correlation gradients that are below a threshold. The 3D surface mesh is further described in reference to FIG. 4.

The generation of the pseudo-activation map relative to the identified core zone (in step 340) involves the computation of pseudo-activation values with respect to the pacing sites. Each of the pseudo-activation values may represent a progression delay along a pathway, through edges of the 3D surface mesh, between a pacing site associated with the identified core zone and a site of the pacing sites. The progression delay along the pathway may be accumulative delay comprising estimates of activation delays of respective edges of the 3D surface mesh along the pathway. In an aspect, the estimates of activation delays comprise respective sQRS delays. In another aspect, the estimates of activation delays comprise respective sinus-rhythm conduction delays. The pathway may represent the shortest path through edges of the 3D surface mesh, so that the sum of weights associated with the edges is minimal. As described in detail below, a weight associated with an edge may represent an sQRS delay (or a sinus-rhythm conduction delay) between pacing sites linked by the edge. The generation of the pseudo-activation map is further described in reference to FIGS. 5-9.

Figure 4:
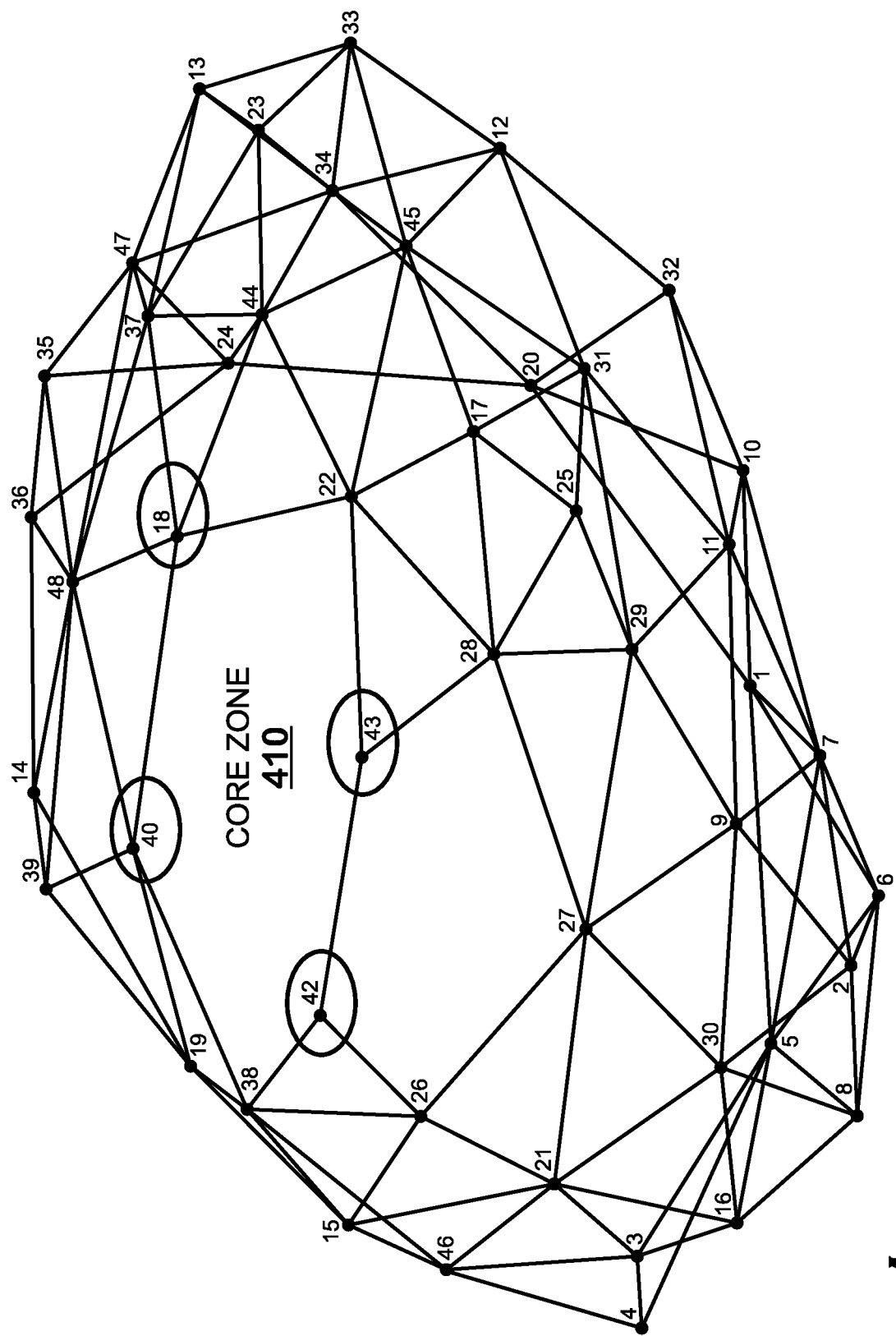
FIG. 4 is an example graph of a three-dimensional surface mesh, based on which one or more features of the disclosure can be implemented.

FIG. 4 is an example graph of a three-dimensional surface mesh 400, based on which one or more features of the disclosure can be implemented. The 3D surface mesh 400 is a low-resolution representation of a surface—for example, and as illustrated in FIG. 4, a low-resolution representation of the surface of the left ventricular chamber of the heart that has been reconstructed based on pacing sites collected in a pace-mapping procedure. Accordingly, the nodes of the graph 400 correspond to N pacing sites, denoted herein as $P_n$ or $P_n(x, y, z)$:n=1–N, defined in a coordinate system centered, for example, on the gravity center of the N pacing sites. To approximate the surface on which the pacing sites are located, neighboring pacing sites (represented by the graph nodes) are connected by the graph edges.

One way to connect the pacing sites (the nodes) of the graph 400 is by employing a Delaunay triangulation. For example, the coordinates [x, y, z] of the pacing sites $P_n$ can be converted into polar coordinates [r, θ, φ]. Then, a two-dimensional Delaunay triangulation can be applied in the (θ, φ) plane to establish the connections between neighboring pacing sites. The resulting list of triangles can be used to connect the pacing sites $P_n$ in the 3D space, forming the 3D surface mesh 400. In an aspect, neighboring pacing sites may be connected in the 3D surface mesh if they are separated from each other by a distance below a threshold.

As mentioned above, activation pathways along the ventricular tissue abruptly change at abnormal zones—core zones of potential reentrant circuits—as can be observed by changes in the morphology of paced ECG data. Abnormal zones can be identified by detecting abrupt morphological changes in paced ECG data, that is, by detecting spatial variations in the pattern of QRS complexes of ECG data acquired as the catheter is moved across neighboring pacing sites. Thus, a spatial variation in the patterns of a pair of QRS complexes, generated by stimulating respective pacing sites, can be measured by a similarity metric (or distance metric) applied to those QRS complexes. For example, a similarity metric may be a correlation coefficient. Accordingly, a similarity metric between two connected pacing sites, $P_i$ and $P_j$ (such as, pacing site $P_{43}$ and pacing site $P_{28}$ of FIG. 4) may be defined as follows:

$$M_{ij} = \frac{1}{L}\sum_{l=1}^{L} M_l(S_{QRS}^l(P_i), S_{QRS}^l(P_j)), \quad (1)$$

where, $M_{ij}$ denotes a similarity metric between pacing sites $P_i$ and $P_j$, that is an average of similarities functions $M_l$ across L leads (signals) of recorded ECG data. Thus, for a lead l, corresponding QRS patterns, $S_{QRS}^l(P_i)$ and $S_{QRS}^l(P_j)$, of respective pacing sites, $P_i$ and $P_j$, are aligned and their morphological similarity is measured by the metric $M_l(S_{QRS}^l(P_i), S_{QRS}^l(P_j))$. The similarity value $M_{ij}$ associated with a pair of pacing sites $P_i$ and $P_j$ can be scaled and expressed by percentage, so that the similarity $M_{ii}$ between the same pace points $P_i$ and $P_i$ is 100%.

Given a similarity metric between two connected pacing sites, the gradient (spatial change) of such similarity metric, namely, the correlation gradient, can be computed. In an aspect, the correlation gradient, denoted $G_{ij} = \nabla M_{ij}$, can be approximated as follows:

$$G_{ij} = |M_{ij} - 100\%|/\|P_i - P_j\|, \quad (2)$$

as described in F. Odille et al., Catheter treatment of ventricular tachycardia: a reference-less pace-mapping method to identify ablation targets, IEEE Transactions on Biomedical Engineering, 66 (11), pp. 3278-3287, 2019.

Correlation gradient values computed with respect to pairs of connected pacing sites (or with respect to edges of the 3D surface mesh 400) may be used to identify one or more core zones. To identify a core zone, a region encompassed by one or more pacing sites with respective high correlation gradients (that is, high $G_{ij}$) can be detected. For example, in FIG. 4, a core zone 410 may be identified, in the region encompassed by $P_{18}$, $P_{40}$, $P_{42}$, and $P_{43}$, based on high correlation gradient values $G_{18,40}$ and $G_{42,43}$. The identified core zone 410, therefore, can be denoted as CZ={18,40,42, 43}.

An identified core zone can next be used to facilitate the generation of a respective pseudo-activation map. To that end, propagation delays of paced ECG signals along pathways on the ventricular tissue may be computed relative to one or more of the pacing sites that identify a core zone, e.g., one or more of pacing sites $P_{18}$, $P_{40}$, $P_{42}$, and $P_{43}$ that identify core zone 410 of FIG. 4. To determine the propagation delays, weights may be calculated with respect to edges of the graph (the 3D surface mesh 400) that link neighboring pacing sites. A weight $w(E_{ab})$ of an edge $E_{ab}$ may correspond to the propagation delay between the two pacing sites $P_a$ and $P_b$ that are linked by of this edge. In an aspect, the propagation delay, $w(E_{a,b})$, associated with the linked pacing sites $P_a$ and $P_b$ may be estimated by the delay between the respective sQRS patterns. In another aspect, the propagation delay, $w(E_{a,b})$, may be estimated by the difference in sinus rhythm activation times at the linked pacing sites. For example, a weight $w(E_{a,b})$ of the linked pacing sites $P_a$ and $P_b$ can be calculated as follows:

$$w(E_{a,b}) = sQRS_{a,b} = |sQRS_a - sQRS_b| \qquad (3)$$

Where $sQRS_{a,b}$ represents the absolute value of the difference in sQRS delay between sites $P_a$ and $P_b$.

Figure 5:
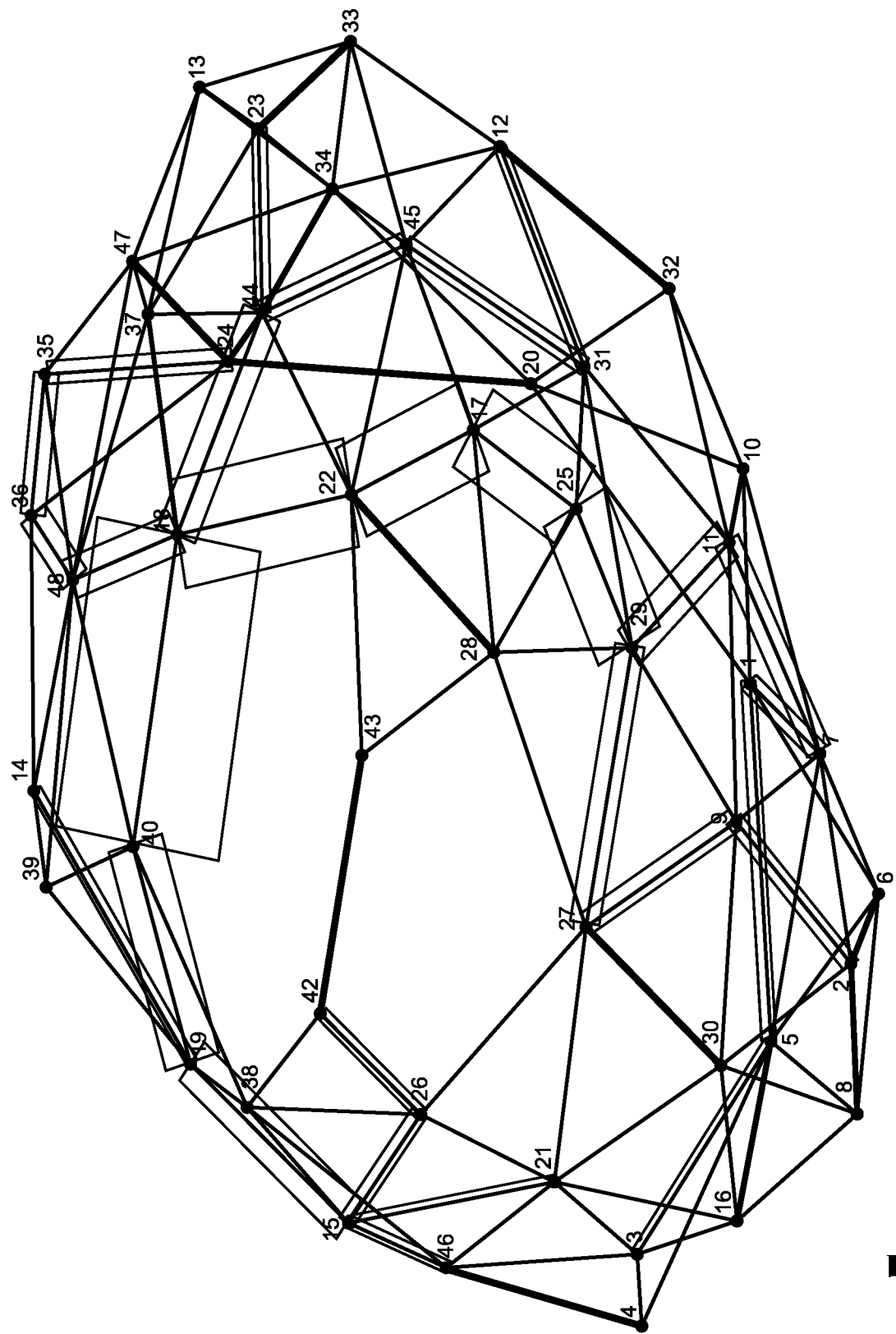
FIG. 5 illustrates a weighted three-dimensional surface mesh, based on which one or more features of the disclosure can be implemented.

Next, the weights of respective edges may be used to calculate the shortest path along the 3D surface mesh 400 between a pacing site that identifies a core zone $P_i^{CZ}$ (e.g., one of the pacing sites $P_{18}$, $P_{40}$, $P_{42}$, and $P_{43}$ that identifies core zone 410) and another pacing site $P_j$ (e.g., $P_6$), that is, $SP_j(P_i^{CZ}, P_j)$. The shortest path may be defined as the path connecting two pacing points on the graph 400, along which the aggregated weights are minimal. Such a shortest path can be calculated using any algorithm for finding the shortest path between nodes in a graph (e.g., Dijkstra's algorithm). FIG. 5 illustrates a weighted three-dimensional surface mesh 500. Therein, weights associated with edges are represented by rectangular shapes with sizes proportional to the delays. Several shortest paths are shown in FIG. 5. For example, the shortest path between pacing site $P_{40}^{CZ}$ and pacing site $P_6$, that is, $SP_6(P_{40}^{CZ}, P_6)$, is shown to include edges: $E_{40,38}$, $E_{38,26}$, $E_{26,21}$, $E_{21,30}$, $E_{30,2}$, and $E_{2,6}$.

The progression delay associated with each pacing site $P_j$ on the 3D surface mesh 400, that is, the pseudo-activation value, $PAV_j$, may be computed by adding the delays along the shortest path $SP_j$ associated with each pacing site $P_j$, as follows:

$$PAV_j(P_i^{CZ}, P_j) = \Sigma_{E_{a,b} \in SP_j(P_i^{CZ}, P_j)} W(E_{a,b}), \qquad (4)$$

where $E_{a,b} \in SP_j(P_i^{CZ}, P_j)$ represents the edges along the shortest path between a pacing site of the core zone $P_i^{CZ}$ and the pacing site $P_j$.

Once pseudo-activation values $PAV_{j=1:N}$ are computed with respect to a pacing site $P_i^{CZ}$, for example, a pseudo-activation map may be generated. To that end, the pseudo-activation values $PAV_{j=1:N}$ of respective pacing sites may be color coded, and these color values may then be interpolated to represent other surface points on the 3D surface mesh 400 that are enclosed by neighboring pacing sites. In an aspect, the 3D surface mesh 400 may be projected (spatially mapped) to a high-resolution mesh that better represents the surface of the ventricular chamber, and, then, the values of vertices of the high-resolution mesh may be computed by interpolation of the color-coded pseudo-activation values of neighboring nodes of the projected 3D surface mesh 400. Color-coded pseudo-activation maps are demonstrated in FIG. 7A and FIG. 9A. Such pseudo-activation maps provide a presentation that visualizes the structure and orientation of potential reentrant circuits within identified core zones.

In an aspect, one pseudo-activation map can be generated, based on pseudo-activation values $PAV_{j=1:N}(P_i^{CZ}, P_j)$, relative to each pacing site $P_i^{CZ}$ of the pacing sites that identify (or are associated with) a core zone, as described above. Alternatively, multiple pseudo-activation maps may be generated relative to respective pacing sites associated with a core zone, and such pseudo-activation maps can be combined (e.g., averaged) to form a combined pseudo-activation map associated with the core zone. Typically, pseudo-activation maps that are generated relative to pacing sites that are associated with the same core zone may be similar as they represent the same reentrant circuit. When more than one distinct core zones are identified, a pseudo-activation map (or a combined pseudo-activation map) may be generated with respect to each core zone, and, so, each map may visualize a distinct reentrant circuit.

The described herein pseudo-activation map can be used to visualize the structure and orientation of a reentrant circuit in an identified core zone. Thus, allowing the determination of a minimal region in which tissue destruction (ablation) should be applied. In an embodiment, the pseudo-activation map is displayed to a cardiac physician through the apparatus 100 and system 200, employing aspects of method 300 implemented by software executable thereon. As mentioned above, pseudo-activation maps allow for the rapid visualization of potential reentrant circuits to be ablated without reference to ECG data that were recorded during an induced VT at the beginning of the procedure.

A study comparing pseudo-activation maps, disclosed herein, to activation maps is next described. The study was carried out using the CARTO3® system (Biosense Webster, Inc., Irvine, USA) and the Niobe® system (Stereotaxis Inc., St. Louis, USA). Anonymized data were exported from the CARTO3® workstation and were then processed using an in-house software written in MATLAB language (The Mathworks, Natick, USA), version R2020a. In the study, electroanatomic data were first loaded into the software, including: catheter positions, 2.5 seconds of 12-lead ECG data acquired for each pacing site, and high-resolution vendor-generated 3D meshes of the ventricular cavity of the heart. All other data (e.g., the 3D surface mesh, 3D correlation gradient map, pseudo-activation maps, and activation maps) used in the study were generated offline with the MATLAB software. In the study, tachycardia was not sustained long enough to map the activation along the entire ventricle and the physician only had time to focus on mapping the main elements of the reentrant circuit when performing activation mapping. The local activation values of the pacing sites were provided using nearest-neighbor interpolation. For a given pacing site, a local activation value was considered to be defined only when the distance to the closest activation point was less than 20 mm. 30 pacing sites were selected.

The tachycardia being a circuit, the local activation time $LAT_{PM_{core}}(i)$ of each pacing site i of the tachycardia can be defined modulo the cycle length. For a given pacing site of an identified core zone, $PM_{core}$ site, an activation time, $LAT_{PM_{core}}(PM_{core})$, of 0 was used. Additionally, only positive values for $LAT_{PM_{core}}(i)$ were used. The local activation values were thus between 0 and the value of the cycle length. For a given $PM_{core}$ site, the opposite activation time $LAT_{OppositePM_{core}}(i)$ was determined by giving the opposite activation time $LAT_{OppositePM_{core}}(PM_{core})$ the value of 0 and to all the other points the value of Cycle Length—$LAT_{PM_{core}}(i)$. The local opposite activation values thus varied between 0 and the value of the cycle length and represented the opposite activation pattern of the tachycardia.

Pseudo-activation maps were generated, as described above, using pacing points in the identified core zone as the starting point to generate respective pseudo-activation maps. These pseudo-activation maps were then compared to the activation pattern, or pathway, of the tachycardia. When the starting point was located in the exit zone of the reentrant circuit, the pseudo activation map was compared to the activation map. When the starting point was located in the entrance zone of the reentrant circuit, the pseudo activation map had an opposite activation pattern and was compared to the opposite activation map. Thus, pacing at the entrance of a reentrant circuit and pacing at the exit of a reentrant circuit results in activation patterns with two opposite directions. Further information about reentrant circuits of a tachycardia can be found in U.S. Pat. No. 10,891,728, which is incorporated by reference in its entirety as if fully set forth herein.

The pseudo-activation maps, activation maps, and opposite activation maps from the study were integrated into a surgical system, such as the CARTO3® platform, for better visualization. The agreement between pseudo-activation maps, activation maps, and opposite activation maps was assessed by various metrics, such as mean, standard deviation, median, mean absolute errors and both Spearman's and Lin's correlation coefficients (see top-left of the graphs in FIG. 6 and FIG. 8).

Figure 6:
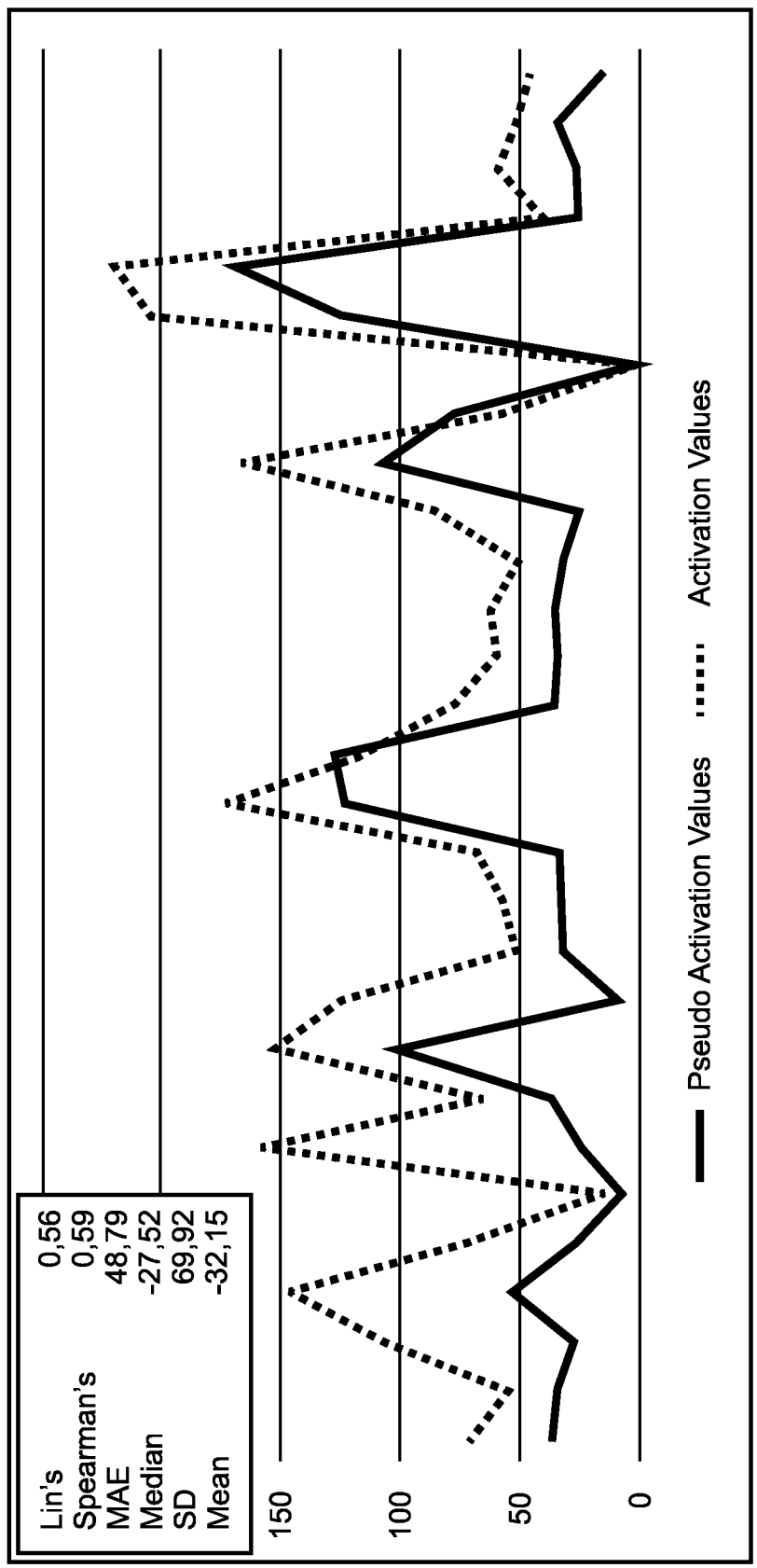
FIG. 6 shows an example chart, comparing pseudo-activation values and activation values, in accordance with one or more embodiments of the disclosure.

FIG. 6 shows an example chart 600, comparing pseudo-activation values and activation values, in accordance with one or more embodiments of the disclosure. The compared pseudo-activation values and activation values were computed with respect to pacing site 40, that is $P_{40}^{CZ}$. This pacing site is located at the exit of the reentrant circuit. The results show that the pseudo-activation values and the activation values are similar—the pseudo-activation values are consistent with the activation values (see metrics on the top-left of the chart 600). FIG. 7 shows a visual representation of the pseudo-activation map (labeled A) and of the activation map (labeled B) computed with respect to pacing site 40. The pseudo-activation map and the activation map are similar. Both maps enable quick identification of areas of interest and show the overall activation pattern of a reentrant circuit. The overall activation pattern is identified by a pattern-sequence. The pattern bar (see bottom-right in FIG. 7) indicates the pattern-sequence 1-6. An area in pattern-1 being activated before an area in pattern-2 that is in turn activated before an area in pattern-3 and so on. The activation time of pacing site 40, $LAT_{P_{40}CZ}(P_{40}^{CZ})$ is 0 in both maps. Pacing site 40 therefore corresponds to the pattern-1 on both maps of FIG. 7.

Figure 8:
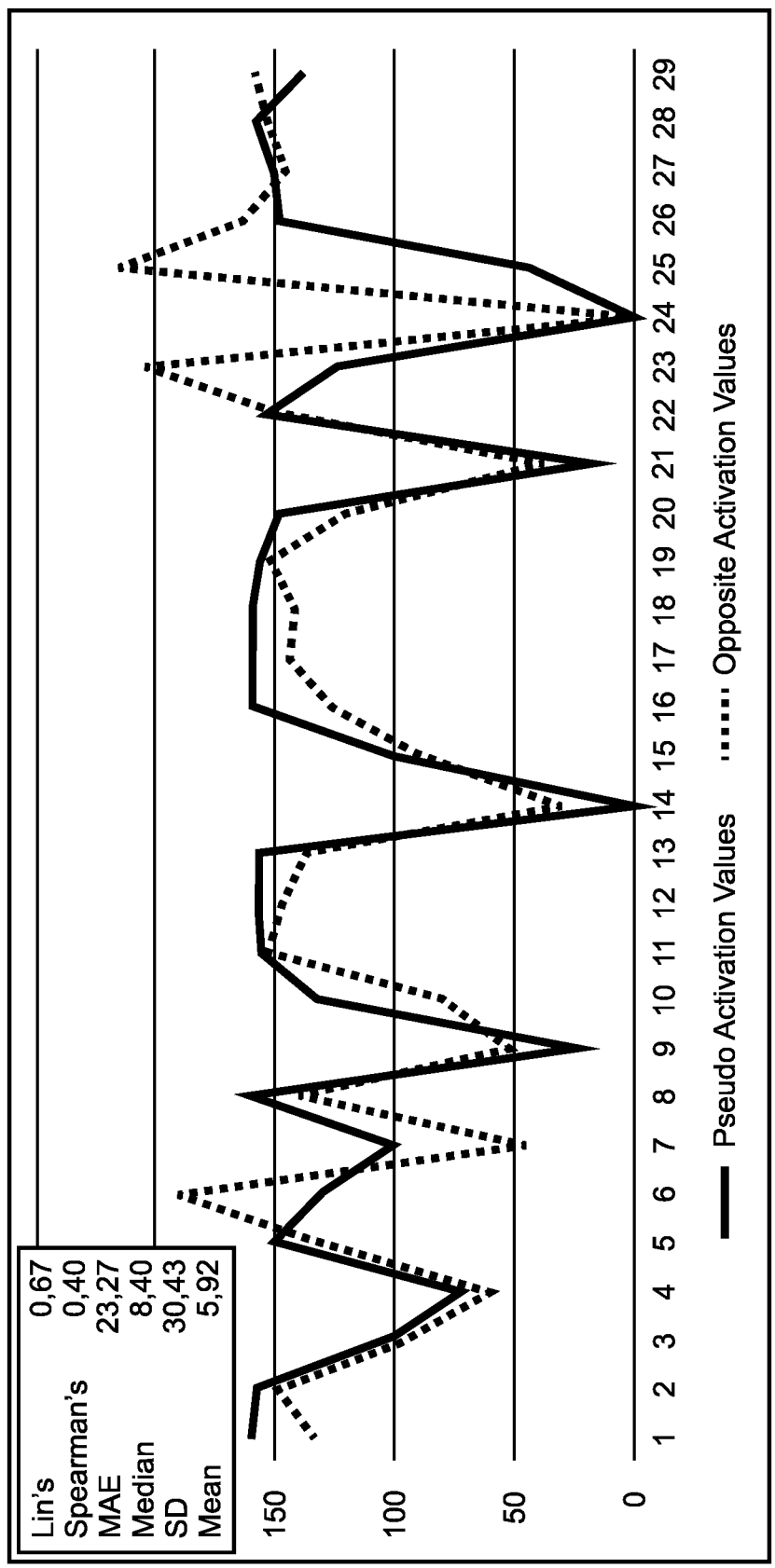
FIG. 8 shows an example chart, comparing pseudo-activation values and activation values, in accordance with one or more embodiments of the disclosure.

FIG. 8 shows an example chart 800, comparing pseudo-activation values and activation values, in accordance with one or more embodiments of the disclosure. The compared pseudo-activation values and activation values were computed with respect to pacing site 42, that is $P_{42}^{CZ}$. This pacing site is located at the entrance of the reentrant circuit. Consequently, the resulting pseudo-activation map has an opposite activation pattern to the activation map. The results shown in FIG. 8 demonstrate agreement between the pseudo-activation values and opposite activation values (see metrics on the top-left of the chart 800). FIG. 9 shows a visual representation of a pseudo-activation map (labeled A) and an opposite activation map (labeled B) computed with respect to pacing site 42. Also here, the pseudo-activation map and the activation map are similar. Both maps enable quick identification of areas of interest and show the overall activation pattern of a reentrant circuit. The overall activation pattern is identified by a pattern-sequence. The pattern bar (see bottom-right in FIG. 9) indicates the pattern-sequence 1-6. An area in pattern-1 being activated before an area in pattern-2 that is in turn activated before an area in pattern-3 and so on. The activation time of pacing site 40, $LAT_{P_{42}CZ}(P_{42}^{CZ})$ is 0 in both maps. Pacing site 40 therefore corresponds to the pattern-1 area on both maps of FIG. 9.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, that comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes measuring, by a plurality of electrodes of a catheter, data from pacing a heart tissue with a plurality of pulses at a plurality of mapping points. The method also includes generating a pseudo-activation map using the measured data, where the pseudo-activation map is used to identify a reentrant circuit. Other embodiments of this aspect include corresponding computer systems, apparatus, and computer programs recorded on one or more computer storage devices, each configured to perform the actions of the methods.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

All patent applications, patents, and printed publications cited herein are incorporated herein by reference in the entireties, except for any subject matter disclaimers or disavowals, and except to the extent that the incorporated material is inconsistent with the express disclosure herein, in which case the language in this disclosure controls.

What is claimed is:

1. A method for visualizing a reentrant circuit in a heart of a patient that improves target identification during a tachycardia (VT) ablation, the method comprising:
   receiving a plurality of sets of electrocardiogram (ECG) data from one or more sensors of a catheter that is located in the heart of the patient, wherein each of the plurality of the sets of ECG data is generated by the catheter pacing tissue of the heart at a respective site among plurality of pacing sites in the heart;
   computing correlation gradients representative of morphological changes across sets, of the sets of the ECG data, of respective neighboring sites among the plurality of the pacing sites;
   identifying, based on the correlation gradients, a core zone associated with the reentrant circuit;
   generating a pseudo-activation map relative to the core zone of the reentrant circuit that identifies an orientation of the reentrant circuit, wherein the generating of the pseudo-activation map relative to the core zone comprises:
      generating a plurality of pseudo-activation maps, each with respect to a pacing site associated with the core zone; and
      combining the plurality of the pseudo-activation maps;
   generating a 3D surface mesh based on the plurality of pacing sites, wherein the plurality of pacing sites form nodes of a graph and respective pairs of the plurality of pacing sites are linked by edges of the graph; and
   displaying the pseudo-activation map overlayed on the 3D surface mesh during the VT ablation.

2. The method of claim 1, wherein the computing of the correlation gradients comprises:
   computing a correlation gradient, of the correlation gradients, with respect to an edge of the 3D surface mesh based on morphological changes between sets of ECG data of respective pacing sites linked by the edge.

3. The method of claim 2, wherein the 3D surface mesh comprises edges with respective correlation gradients that are below a threshold.

4. The method of claim 1, wherein the generating of the pseudo-activation map relative to the core zone comprises:
   computing pseudo-activation values with respect to the pacing sites, each of the pseudo-activation values represents a progression delay along a pathway, the pathway extends from a first pacing site associated with the core zone, through edges of the 3D surface mesh, to a second pacing site among the plurality of the pacing sites.

5. The method of claim 4, wherein the progression delay represents an accumulative delay include:
   estimates of activation delays of respective edges of the 3D surface mesh along the pathway.

6. The method of claim 5, wherein the estimates of activation delays comprise respective stimulation-to-QRS (sQRS) delays.

7. The method of claim 5, wherein the estimates of activation delays comprise respective sinus-rhythm conduction delays.

8. The method of claim 4, wherein the pathway represents a shortest path, so that a sum of weights associated with edges along the pathway is minimal.

9. The method of claim 8, wherein each of the weights represents an estimate of activation delay between pacing sites linked by a respective edge, the activation delay is one of an sQRS delay or a sinus-rhythm conduction delay.

10. A system for visualizing a reentrant circuit in a heart of a patient that improves target identification during a tachycardia (VT) ablation, the comprising:
   a memory;
   a communication interface that is communicatively coupled to one or more sensors of a catheter that is inserted into the heart of the patient;
   one or more processors that are communicatively coupled to the memory and the communication interface, wherein the one or more processors are collectively configured to:
   receive, using the communication interface, a plurality of sets of electrocardiogram (ECG) data from the one or more sensors during the VT ablation, wherein each of the plurality of the sets of ECG data is generated by the catheter pacing tissue of the heart at a respective site among plurality of pacing sites in the heart, compute correlation gradients representative of morphological changes across sets, of the sets of the ECG data, of respective neighboring sites among the plurality of the pacing sites, identify, based on the correlation gradients, a core zone associated with the reentrant circuit, generate a pseudo-activation map relative to the core zone of the reentrant circuit that identifies an orientation of the reentrant circuit, wherein the pseudo-activation map relative to the core zone is generated by:

generating a plurality of pseudo-activation maps, each with respect to a pacing site associated with the core zone; and combining the plurality of the pseudo-activation maps;

generate a 3D surface mesh based on the plurality of pacing sites, wherein the plurality of pacing sites form nodes of a graph and respective pairs of the plurality of pacing sites are linked by edges of the graph; and display the pseudo-activation map overlayed on the 3D surface mesh during the VT ablation.

11. The system of claim 10, wherein the computing of the correlation gradients comprises:

computing a correlation gradient, of the correlation gradients, with respect to an edge of the 3D surface mesh based on morphological changes between sets of ECG data of respective pacing sites linked by the edge.

12. The system of claim 11, wherein the 3D surface mesh comprises edges with respective correlation gradients that are below a threshold.

13. The system of claim 10, wherein the generating of the pseudo-activation map relative to the core zone comprises:

computing pseudo-activation values with respect to the pacing sites, each of the pseudo-activation values represents a progression delay along a pathway, the pathway extends from a first pacing site associated with the core zone, through edges of the 3D surface mesh, to a second site among the plurality of the pacing sites.

14. The system of claim 13, wherein the progression delay represents an accumulative delay includes:

estimates of activation delays of respective edges of the 3D surface mesh along the pathway.

15. The system of claim 14, wherein the estimates of activation delays comprise respective sQRS delays.

16. The system of claim 14, wherein the estimates of activation delays comprise respective sinus-rhythm conduction delays.

17. The system of claim 13, wherein the pathway represents a shortest path, so that a sum of weights associated with edges along the pathway is minimal.

18. The system of claim 17, wherein each of the weights represents an estimate of activation delay between pacing sites linked by a respective edge, the activation delay is one of an sQRS delay or a sinus-rhythm conduction delay.

19. A non-transitory computer-readable medium comprising instructions for visualizing a reentrant circuit in a heart of a patient that improves target identification during a tachycardia (VT) ablation, the instructions when executed by a processor of a surgical console, cause the surgical console to perform a method comprising:

receiving a plurality of sets of electrocardiogram (ECG) data from one or more sensors of a catheter that is located in the heart of the patient, wherein each of the plurality of the sets of ECG data is generated by the catheter pacing tissue of the heart at a respective site among plurality of pacing sites in the heart;

computing correlation gradients representative of morphological changes across sets, of the sets of the ECG data, of respective neighboring sites among the plurality of the pacing sites;

identifying, based on the correlation gradients, a core zone associated with the reentrant circuit;

generating a pseudo-activation map relative to the core zone of the reentrant circuit that identifies an orientation of the reentrant circuit, wherein the generating of the pseudo-activation map relative to the core zone comprises:

generating a plurality of pseudo-activation maps, each with respect to a pacing site associated with the core zone; and combining the plurality of the pseudo-activation maps;

generating a 3D surface mesh based on the plurality of pacing sites, wherein the plurality of pacing sites form nodes of a graph and respective pairs of the plurality of pacing sites are linked by edges of the graph; and displaying the pseudo-activation map overlayed on the 3D surface mesh during the VT ablation.

* * * * *

UNITED STATES PATENT AND TRADEMARK OFFICE
CERTIFICATE OF CORRECTION

PATENT NO. : 12,465,269 B2
APPLICATION NO. : 17/724146
DATED : November 11, 2025
INVENTOR(S) : Philip Hoyland et al.

It is certified that error appears in the above-identified patent and that said Letters Patent is hereby corrected as shown below:

In the Specification

In Column 4, Line 53, delete "(that as" and insert -- (as --, therefor.
In Column 6, Line 5, delete "personnel" and insert -- personnel with --, therefor.
In Column 9, Line 10, delete "(AWS)®)" and insert -- (AWS)) --, therefor.
In Column 12, Line 52, delete "similarities" and insert -- similarity --, therefor.
In Column 13, Line 27, delete "by of" and insert -- by --, therefor.

In the Claims

In Column 17, Line 53, in Claim 1, delete "tachycardia (VT)" and insert -- ventricular tachycardia (VT) --, therefor.
In Column 18, Line 53, in Claim 10, delete "tachycardia (VT)" and insert -- ventricular tachycardia (VT) --, therefor.
In Column 20, Line 13, in Claim 19, delete "tachycardia (VT)" and insert -- ventricular tachycardia (VT) --, therefor.

Signed and Sealed this
Thirteenth Day of January, 2026

John A. Squires
*Director of the United States Patent and Trademark Office*